Figure 1:
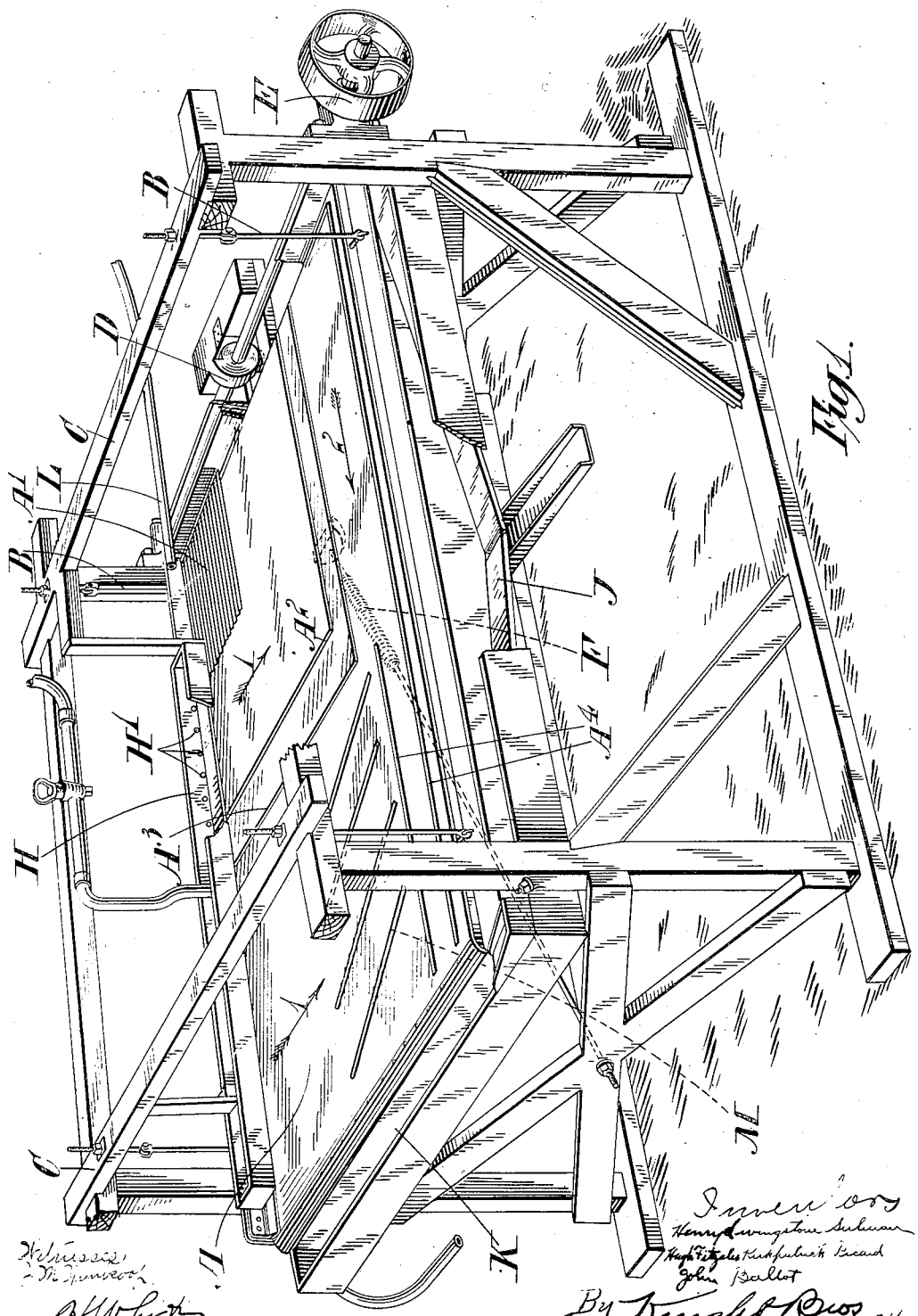

No. 879,985. PATENTED FEB. 25, 1908.
H. L. SULMAN, H. F. KIRKPATRICK-PICARD & J. BALLOT.
SEPARATION OF METALLIFEROUS MINERALS FROM GANGUE.
APPLICATION FILED FEB. 20, 1905.

4 SHEETS—SHEET 2.

No. 879,985. PATENTED FEB. 25, 1908.
H. L. SULMAN, H. F. KIRKPATRICK-PICARD & J. BALLOT.
SEPARATION OF METALLIFEROUS MINERALS FROM GANGUE.
APPLICATION FILED FEB. 20, 1905.

4 SHEETS—SHEET 3.

No. 879,985. PATENTED FEB. 25, 1908.
H. L. SULMAN, H. F. KIRKPATRICK-PICARD & J. BALLOT.
SEPARATION OF METALLIFEROUS MINERALS FROM GANGUE.
APPLICATION FILED FEB. 20, 1905.
4 SHEETS—SHEET 4.
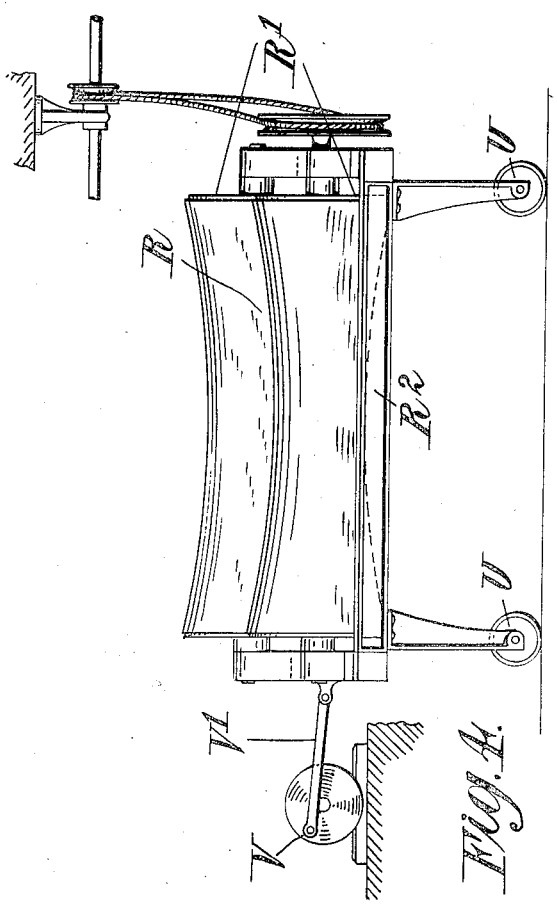

UNITED STATES PATENT OFFICE.

HENRY LIVINGSTONE SULMAN, HUGH FITZALIS KIRKPATRICK-PICARD, AND JOHN BALLOT, OF LONDON, ENGLAND.

SEPARATION OF METALLIFEROUS MINERALS FROM GANGUE.

No. 879,985.      Specification of Letters Patent.      Patented Feb. 25, 1908.

Application filed February 20, 1905. Serial No. 246,637.

*To all whom it may concern:*

Be it known that we, HENRY LIVINGSTONE SULMAN, HUGH FITZALIS KIRKPATRICK-PICARD, and JOHN BALLOT, subjects of the King of England, and residing in London, England, have invented certain new and useful Improvements in the Separation of Metalliferous Minerals from Gangue, of which the following is a specification.

This invention relates to improvements in the separation of metalliferous matter from gangue and has for its object to effect such separation by the agency of a substance which has a preferential affinity for metalliferous matter over gangue, and by the agency of air or other gas. The substances such as oil, fatty acid, or oleaginous, fatty or tarry substances which have a tendency to wet metalliferous matter in preference to gangue will hereinafter be referred to as "oil".

According to this invention the principles of surface-tension are applied in effecting the separation. The mineral pulp is mixed with "oil" and is exposed to a free air surface; and thereafter the mineral is brought on to the surface of water or other liquid, whereby the oiled metalliferous particles, having been exposed to air, are unable to overcome the surface tension of the water and float, while the unoiled gangue sinks through the surface of the water, the former being thus separated from the latter and removed by any suitable means.

In one particular application of this invention the pulp mixed with "oil" is distributed in the form of a thin sheet on the surface of an inclined vanning table having a transverse stream of water and currents of air are directed on to the table to expose immersed mineral to a free air surface whereupon the metalliferous matter floats and is separated from the gangue which sinks.

It is known that every free water surface, i. e. a water surface in contact with air or other gas, exhibits a resistance to rupture from without greater than that which is offered by its interior mass. This phenomenon is known as the surface-tension of water and permits small particles of greater specific gravity than water to float upon it without rupturing its surface. All liquids exhibit surface tension phenomena to a greater or less degree, but the results are very marked where previously oiled particles are brought upon the surface of an aqueous liquid in which the oil or other fatty substance employed is insoluble or immiscible.

The resultant of the surface-tensions between the oiled particles and air and between that of the water and air, is so increased over that which exists between the air and water and air and unoiled particles, that oily particles of a much higher specific gravity in relation to water are unable to break through the water surface and therefore float with ease, quite apart from any slight diminution to their specific weight by means of adhering oil; whereas, particles of lesser specific gravity, but unoiled, readily break through the water surface, especially if these particles be previously wetted with water.

The physical phenomena above defined are according to this invention applied as follows:—The ore in which it is desired to separate metalliferous mineral from gangue is reduced to powder of a suitable degree of fineness, and mixed with water. To the mixture, oil or fatty substance, either in a free state or as an emulsion, is added and the whole thoroughly mixed; the water may have either an acid or alkaline reaction according to the nature of the ore to be treated. Oil or fatty substance exhibits the well known tendency to adhere preferentially to metalliferous mineral immersed or suspended in water; but does not attach itself to gangue or oxids. The amount of oil used may be comparatively small in relation to the ore pulp or to the mineral present. It is not employed in quantities sufficient to buoy up, by virtue of its lesser specific gravity, the mineral particles to which it attaches itself; but it is sufficient to use only such a quantity as will insure each mineral particle being thinly coated with a film of oil or fatty substance. The mass of oiled and unoiled particles is now brought in contact with air or other gas, either by removal of the mass from the aqueous liquid or by draining off the latter; and in order to insure sufficient air contact, the mass should be exposed in comparatively thin layers or sheets. If the particles be now brought upon or into contact with a fresh water surface, the previously specified surface-tension factors are brought into play, and it will be found that the oiled metalliferous particles can be floated off with ease and completeness from the gangue or unoiled particles, the latter sinking through the water surface.

Figure 2:
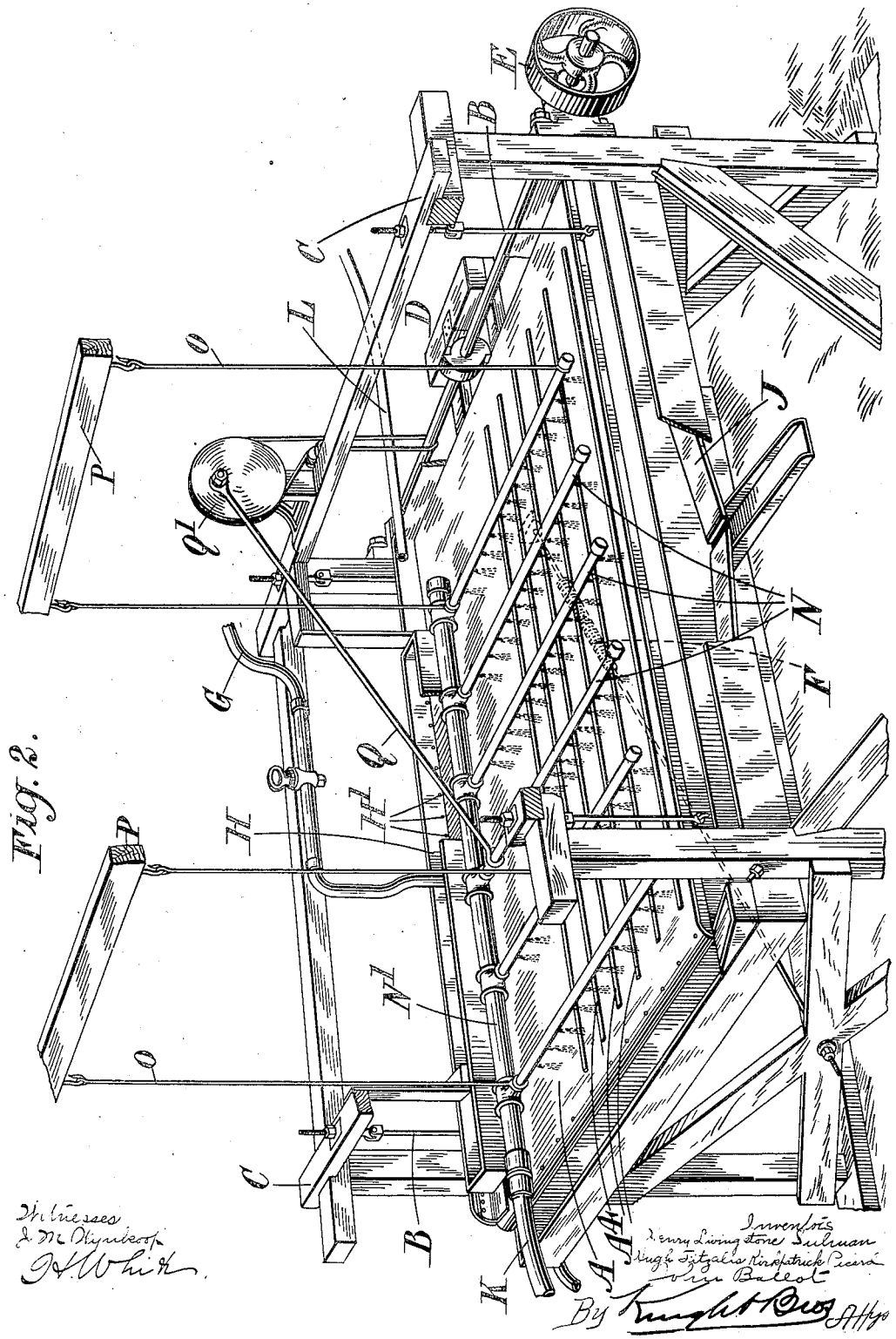
Figure 3:
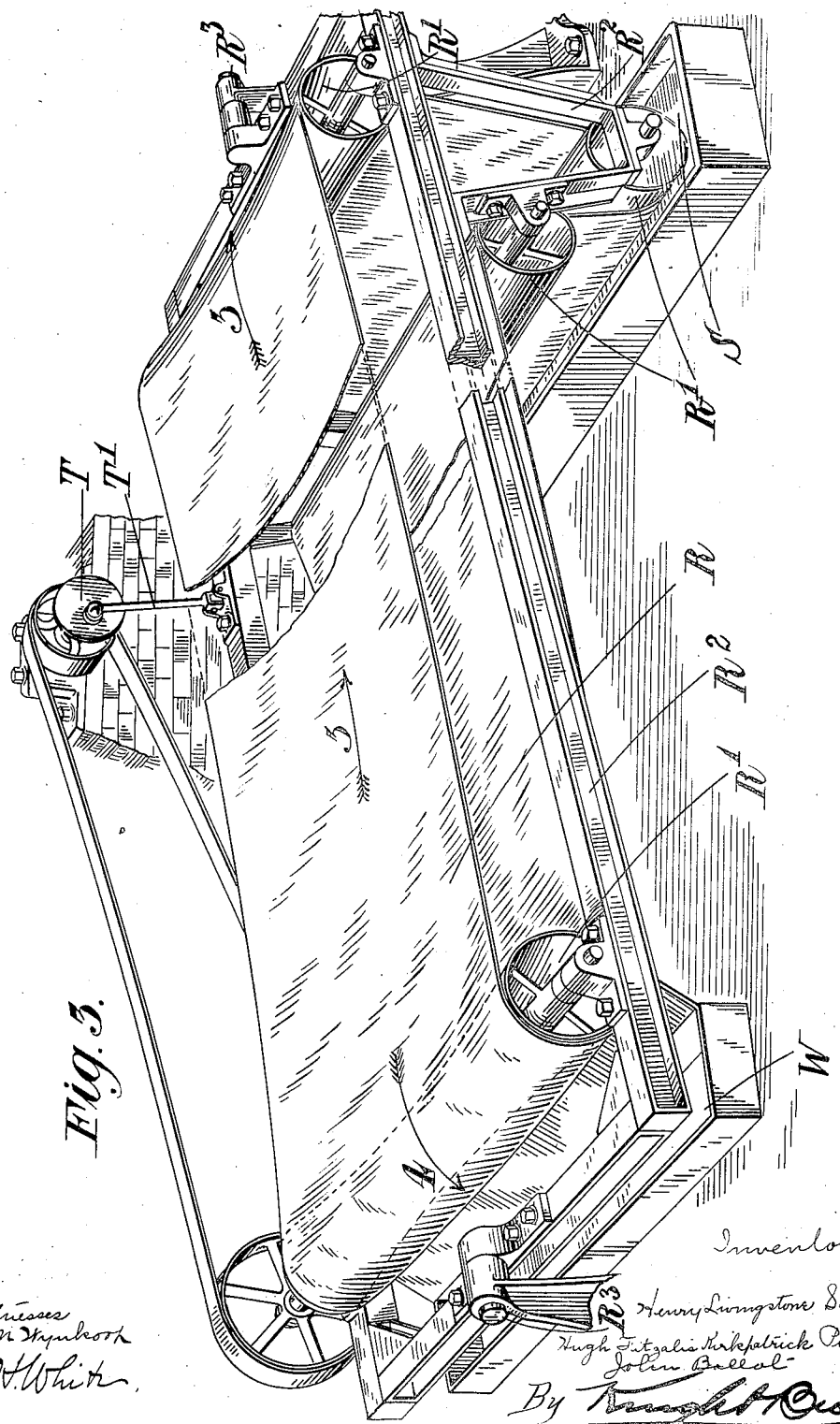

In the accompanying drawings:—Figures 1, 2 and 3 are perspective views of three different forms of apparatus suitable for carrying this invention into practical effect; and Fig. 4 is an end elevation of a modification of Fig. 3.

Referring to Fig. 1, an inclined vanning table A is supported by hangers B from a fixed framework C. An endwise jerking motion is imparted to the table in the direction of the arrows 2 by a cam D rotated by a driven pulley E, and a strong spring F acts in the opposite direction to the cam. A stream of water from a pipe G is distributed from a channel H perforated as at $H^1$ so as to flow across the table in the direction of the arrows 1. At the discharge side of the table is one launder J while a second launder K at the end of the table receives the longitudinal discharge. The mineral may be oiled in the manner before indicated or according to any of the known means, and the pulp mass is fed through a pipe L and through a suitable distributer, if required, on to the surface of the table A. Directly the oiled particles, having come into contact with air arrive on the water surface, they float for a sufficiently long period in the direction of the arrows 1 and thus permit of their separation and recovery in the launder or receptacle J; while the gangue sinks through the film of aqueous liquid and in consequence of the vanning motion imparted to the table works forward in the direction of the arrows 2 and is collected in the launder or receptacle K. In order to expose the pulp to the air as much as possible the surface of the table may be corrugated as at $A^1$ or a series of steps such as $A^2$ $A^3$ may be formed thereon. Or a series of raised surfaces M placed at a suitable angle to the forward travel of the submerged particles may be formed on the surface of the table, over which the submerged particles are forced to climb by virtue of the forward jerking motion, and by these means any oiled particle which may have escaped air contact is caused to come into such contact. If required guiding ribs $A^4$ may be attached, to direct the gangue to the launder K.

Referring now to Fig. 2, the vanning table is arranged as described with reference to Fig. 1 without the parts $A^1$, $A^2$, $A^3$, but if desired with longitudinal ribs $A^4$. Above the table is arranged a series of pipes N perforated on the under side, supported by wires or ties O from a framework P or the like. To the pipes N is attached a connecting rod Q reciprocated by a crank $Q^1$ so that the pipes are moved to and fro above the surface of the table. Air is led into the pipes N through an inlet tube $N^1$. Should any oiled mineral penetrate the water surface, it will be brought into contact with air again by the air jets blowing on the surface so as to rupture it and expose the immersed oiled particles to the air.

Referring to Fig. 3, the continuous inclined concave belt R passing over the rollers $R^1$ is driven upwards on the top side in the direction of the arrows 3; then it passes down through a trough S containing water. The rollers $R^1$ are carried in a frame $R^2$ pivoted at $R^3$ about the longitudinal axis and the frame is rocked about its pivots by a crank T and connecting rod $T^1$. Or as shown in Fig. 4 the frame may be mounted on rollers U and lateral reciprocating motion imparted to the frame by a crank V and connecting rod $V^1$. The pulp is fed on to the top of the moving belt and a certain proportion of oiled mineral floats, and is carried downward by the stream into the launder W in the direction of the arrow 4; while the unoiled particles sink and are carried up by the belt in the direction of the arrows 3, and discharged into the trough S. As the belt rocks or reciprocates, the liquid moves from side to side, and at each movement leaves some mineral freely exposed to the air on the side of the belt. Thus, any immersed oiled particles become exposed to a free air surface and on the return of the liquid are floated off and carried down into the launder W. The inclination of the belt must be so regulated that no sands are mechanically carried off with the concentrates.

Any apparatus suitable for the separation of floating from immersed solid particles may be used to effect the separation according to this invention. The water used to form the water surface may conveniently be slightly acid or in certain cases slightly alkaline, provided that the alkalinity is not sufficient to affect the surface-tension.

The flotation power exerted in the method above described is so considerable that aggregations of heavy oiled mineral particles may be observed floating upon the surface of the water, (more or less self-adherent) and exhibiting a concave or boat-like formation upon the surface of the water, due to the great specific gravity of the mineral particles which in consequence of their oiled surfaces are yet unable to break through the water surface.

We are aware that gases have been used previously for the separation of oiled mineral particles from unoiled particles when immersed beneath the surface of an aqueous liquid. This has been effected by the attachment of gas bubbles (preferably generated in the liquid i. e. in an acid condition) whereby the mineral particles are raised to the surface by means of the buoyancy of the gas bubbles adhering to the particles. It is to be clearly understood that our method of separation does not take place beneath the water surface but depends solely on the flotation of previously oiled particles which have been brought into contact with air or other gas and then introduced upon the water surface.

What we claim as our invention and desire to secure by Letters Patent is:—

1. The process of treating ores to separate metalliferous matter from gangue which consists in mixing the powdered mineral with water to form a freely flowing pulp, agitating the mineral pulp with a small quantity of oil sufficient only to impart a thin coating of oil to the metalliferous particles, distributing the mixture in the form of a thin sheet of flowing liquid, causing the immersed particles to be exposed to the air and thereafter to meet the surface of the liquid, collecting the floating oiled metalliferous particles and collecting the gangue which sinks.

2. The process of treating ores to separate metalliferous matter from gangue which consists in mixing the powdered mineral with water to form a freely flowing pulp, agitating the mineral pulp with a small quantity of oil sufficient only to impart a thin coating of oil to the metalliferous particles distributing the mixture in the form of a thin sheet of flowing liquid, directing currents of air on to the liquid to expose the immersed mineral to the air, whereby the oil-coated metalliferous particles float, collecting the floating oiled metalliferous particles and collecting the gangue which sinks.

In testimony whereof we have signed our names to this specification in the presence of two subscribing witnesses.

HENRY LIVINGSTONE SULMAN.
HUGH FITZALIS KIRKPATRICK-PICARD.
JOHN BALLOT.

Witnesses:
WILLIAM H. BALLANTYNE,
W. W. WEBSTER.